United States Patent [19]
Phillipps et al.

[11] 3,883,569
[45] May 13, 1975

[54] NOVEL 3α-HYDROXYSTEROIDS OF THE 5α-PREGNANE SERIES

[75] Inventors: Gordon Hanley Phillipps, Wembley; Christopher Earle Newall, Acton; Martin Christopher Cook, Chalfont St. Peter, all of England

[73] Assignee: Glaxo Laboratories Limited, Greenford, Middlesex, England

[22] Filed: Dec. 16, 1971

[21] Appl. No.: 208,985

[30] Foreign Application Priority Data
Dec. 17, 1970 United Kingdom............... 60066/70

[52] U.S. Cl. .... 260/397.45; 260/239.5; 260/239.55
[51] Int. Cl............................................ C07c 169/32
[58] Field of Search ............................... 260/397.45

[56] References Cited
UNITED STATES PATENTS
3,714,352  1/1973  Davis et al. ......................... 424/243

FOREIGN PATENTS OR APPLICATIONS
970,487  9/1964  United Kingdom............ 260/397.45

Primary Examiner—Elbert L. Roberts
Attorney, Agent, or Firm—Bacon & Thomas

[57] ABSTRACT

Steroids of the 5α-pregnane series possessing a 3α-hydroxy group, a 10-hydrogen atom or methyl group, an 11-oxo group, a 17α-hydrogen atom, a 20-oxo group, and a group of the formula -XR at the 21-position wherein -XR represents —OCOR, —OCOOR, —CCOSR or —OCONHR and R represents (a) a solubilising group containing a basic nitrogen atom, (b) a nitrobenzyl group (c) a lower alkyl group (when X is not —OCO—) or (d) a halogenoalkyl group.

The steroids possess anaesthetic properties.

12 Claims, No Drawings

NOVEL 3α-HYDROXYSTEROIDS OF THE 5α-PREGNANE SERIES

This invention is concerned with improvements in or relating to compounds of the pregnane series having useful anaesthetic activity.

It has long been known that a number of steroids give rise to profound depression of the central nervous system and act pharmacodynamically as anaesthetics or hypnotics. Such compounds have been the subject of considerable study in an attempt to find anaesthetics to replace such substances as thiopentone sodium, normally used but well known to be accompanied by some degree of hazard and disadvantage. The literature shows that very many steroid compounds have been studied in this regard. Reviews and discussions of some of the work carried out are to be found, for example, in "Methods in Hormone Research" (Edited by Ralph I. Dorfman, Vol. III, Part A, Academic Press, London and New York, 1964, pages 415–475); H. Witzel, Z. Vitamin Hormon-Fermentforsch 1959, 10, 46–74; H. Selye, Endocrinology, 1942, 30, 437–453; S. K. Figdor et al., J. Pharmacol. Exptl. Therap., 1957, 119, 299–309 and Atkinson et al., J. Med. Chem. 1965, 8, 426–432.

A thorough review of the literature indicates that anaesthetic steroids generally possess poor activity and/or long induction periods. With such compounds a variety of undesired side effects such as paraesthesia and vein damage have also been noted. Steroids possessing anaesthetic activity hitherto described are generally relatively simple pregnane derivatives, often hydroxylated in the 3-position, the general trend having been in the latter case to study 3α-hydroxy compounds rather than 3α-hydroxy compounds.

We have now found that certain new compounds of the 5α-pregnane series which possess inter alia a 3α-hydroxy-21-acyloxy-11,20-dioxo structure and which are more particularly described hereinafter have remarkable anaesthetic properties.

The aforesaid 3α-hydroxy-21-acyloxy-11,20-dioxo-5α-pregnanes may be generally characterised as being steroids of the 5α-pregnane series having anaesthetic properties and further characterised by possessing a 17α-hydrogen atom and a group of formula -XR at the 21-position, wherein XR represents a group of formula —OCOR, —OCOOR —OCOSR or —OCONHR and R represents (a) a solubilising group containing a basic nitrogen atom (e.g. a hydrocarbon group such as an alkyl, aralkyl or aryl group substituted by an amino group, which may be a member of a heterocyclic group; or nitrogen-containing heterocyclic group); (b) a nitro benzyl group, (c) a lower alkyl group (having for example 1–6 carbon atoms) when X is not —OCO—; or (d) a halogenoalkyl group, particularly a halogeno lower alkyl group having 1–6 carbon atoms.

The expression "pregnane series" as used herein includes not only compounds of the conventional pregnane ring structure but also the corresponding 19-nor compounds, the presence or absence of a methyl group at the 10-position having little influence on anaesthetic properties.

The above-defined 3α-hydroxy-21-acyloxy-pregnane anaesthetics have been found to induce anaesthesia with generally short induction periods, the anaesthetic action at suitable doses being in general instantaneous; the compounds are thus excellent anaesthetics for inducing anaesthesia which is to be maintained e.g. by an inhalation anaesthetic such as ether, halothane, nitrous oxide, trichloroethylene etc. The compounds are however capable of maintaining anaesthesia and analgesia to a sufficient degree to enable various surgical operations to be conducted without the aid of an inhalation anaesthetic, the required degree of anaesthesia being maintained if necessary by repeated administration (or even continuous administration). Moreover, the said anaesthetics in accordance with the invention in general give rise to minimal side-effects as compared with previously described steroidal anaesthetics.

The new compounds according to the invention may also serve as solubilisers for the anaesthetic steroid 3α-hydroxy-5α-pregnane-11,20-dione in analogous manner to the 21-acyloxy compounds described in our Belgian Patent Specification No. 752165. Thus we have found it possible in certain instances to prepare solutions of 3α-hydroxy-5α-pregnane-11,20-dione, in for example aqueous solutions of parenterally acceptable surface active agents, having as solubility promoter a compound in accordance with this invention. An important example of such a solubility promoter is 3α-hydroxy-21-iodoacetoxy-5α-pregnane-11,20-dione. In this manner the solubility of the 3α-hydroxy-5α-pregnane-11,20-dione may be increased several-fold.

The 3α-hydroxy compounds of the invention may be regarded as central nervous system depressants and thus in suitable doses may also be used as hypnotics or sedatives.

Particularly useful anaesthetic compounds in accordance with the invention are derivatives of 3α-hydroxy-5α-pregnane-11,20-dione having a group -XR at the 21-position.

A particularly preferred group of compounds in accordance with the invention are the above said compounds wherein XR is an —OCOR group.

Preferably, especially when XR is OCOR, R is a lower alkyl ($C_1$–$C_5$) group, a phenyl group or a benzyl group, each of which is substituted by at least one primary, secondary or tertiary amino group; examples of such alkyl groups are methyl, ethyl, propyl, butyl and pentyl groups substituted by at least one primary secondary or tertiary amino group. The amino substituent is conveniently a group of formula —$NR^1R^2$ wherein $R^1$ and $R^2$, which may be the same or different, each represents a hydrogen atom or a lower ($C_1$–$C_4$) alkyl group or $R^1$ and $R^2$ together with the adjacent nitrogen atom represent a 5- or 6-membered heterocyclic group which may contain other hetero atoms e.g. a piperazino or morpholino group which may, if desired, be substituted by at least one alkyl (e.g. lower alkyl having 1–6 carbon atoms, such as methyl) group; examples of such groups include an amino group, a methylamino group, a dimethylamino group, an ethylamino group, a diethylamino group or an N-methylpiperazino group.

Yet a further group of preferred compounds in accordance with the invention includes those wherein R represents a pyridyl (e.g. a pyrid-3-yl) group.

As will be appreciated amino substituents permit formation of acid addition salts tending to improve the water-solubility of the steroid. Such salts include hydrochlorides, hydrobromides, sulphates, p-toluene sulphonates, methane sulphonates, citrates, tartrates, and phosphates and other salts formed with physiologically compatible acids.

Examples of amino-substituted groups R include amino-methyl, p-aminobenzyl, dimethylaminomethyl, diethylaminomethyl, morpholinomethyl.

The 3α-hydroxy-21-acyloxy-pregnane anaesthetics may contain further substitution, for example at the 16-position. Examples of substituents which may be present at position-16 include either one or two alkyl groups, especially lower (e.g. having 1–6 carbon atoms) alkyl groups, for example methyl groups.

The compounds of the invention may for example also be substituted at the 2β-position for example by an acyloxy group containing for example 1–9 carbon atoms, an ether or thioether group (i.e. the residue of an alcohol, a phenol or a thiol) containing for example 1–9 carbon atoms (e.g. methoxy), an alkyl or cycloalkyl group for example containing up to 9 carbon atoms, an aryl group (e.g. a phenyl group), an aralkyl group (e.g. a benzyl group), a hydroxy group, a thiocyanato group, a nitro-oxy group, or a halogen atom. Acyloxy substituents (which may be saturated or unsaturated) include lower ($C_1$–$C_6$) alkanoyloxy groups, (substituted if desired, for example with one or more halogen e.g. chlorine atoms, lower alkoxy, amino and substituted amino groups), aroyloxy groups, e.g. a benzoyloxy group or aralkanoyloxy groups, e.g. a phenylacetoxy group. Ether substituents, which may be saturated or unsaturated, include lower ($C_1$–$C_6$) alkoxy groups, lower alkenyloxy groups (e.g. an allyloxy group), cycloalkoxy groups, e.g. a cyclohexyloxy group, aryloxy groups, e.g. a phenoxy group and aralkoxy groups e.g. a benzyloxy group. Thioether groups corresponding to the last-mentioned oxygen groups are representative of 2β-thioether substituents.

The 2β-substituent may alternatively be an azido, sulphonyloxy (e.g. tosyloxy) group or an acylthio group.

Examples of alkyl groups include especially lower alkyl groups containing 1–5 carbon atoms such as methyl, ethyl, propyl, butyl, isobutyl and t-butyl groups. An example of a cycloalkyl group is a cyclohexyl group.

Examples of lower alkanoyloxy 2β-substituents include acetoxy, propionyloxy, butyryloxy, piperidinoacetoxy, morpholinoacetoxy, diethylaminoacetoxy and chloroacetoxy groups. Examples of lower alkoxy groups include methoxy, ethoxy, propoxy, isopropoxy, n-butoxy and t-butoxy groups, and the corresponding thio compounds exemplify lower alkyl thio substituents.

Lower alkoxy and lower alkylthio substituents at the 2β-position may themselves be substituted for example by one or more halogen (e.g. chlorine) atoms, lower alkoxy, esterified carboxyl (e.g. ethoxycarbonyl), hydroxy, amino or substituted amino, e.g. morpholino groups, or substituted or unsubstituted acyloxy e.g. morpholinoacetoxy, chloroaceteoxy or diethylaminoacetoxy or heterocyclic groups, e.g. a tetrahydrofuranyl group. Alkyl, cycloalkyl and aryl groups may also be substituted.

Particularly preferred compounds according to the invention by virtue of their excellent anaesthetic properties are:

21-aminoacetoxy-3α-hydroxy-5α-pregnane-11,20-dione hydrochloride,
21-p-aminophenylacetoxy-3α-hydroxy-5α-pregnane-11,20-dione,
21-ethoxycarbonyloxy-3α-hydroxy-5α-pregnane-11,20-dione,
21-chloroacetoxy-3α-hydroxy-5α-pregnane-11,20-dione,
3α-hydroxy-21-iodoacetoxy-5α-pregnane-11,20-dione,
3α-hydroxy-21-morpholinoacetoxy-5α-pregnane-11,20-dione,
3α-hydroxy-21-dimethylaminoacetoxy-5α-pregnane-11,20-dione (and its citrate),
21-diethylaminoacetoxy-3α-hydroxy-5α-pregnane-11,20-dione (and its citrate), and
21-diethylaminoacetoxy-3α-hydroxy-2β-methoxy-5α-pregnane-11,20-dione.

The above-defined 3α-hydroxy-21-acyloxy-pregnane anaesthetics may be formulated as convenient, following generally known pharmaceutical (which in the present specification includes both human and veterinary) practices, with the aid of one or more pharmaceutical carriers or excipients. For anaesthetic purposes, the steroids will be given by injection and thus one aspect of this invention comprises an anaesthetic composition for parenteral administration comprising a 3α-hydroxy-21-acyloxy-pregnane anaesthetic as above-defined in a parenterally acceptable vehicle.

If the above-described 3α-hydroxy-21-acyloxy-20-oxo pregnane anaesthetics are sufficiently soluble in water (e.g. the salts and particularly the citrates referred to above), they may be formulated in an aqueous solutions (e.g. isotonic sterile solutions).

If the above-described 3α-hydroxy-21-acyloxy-20-oxo pregnane anaesthetics are poorly soluble in water they may be formulated for parenteral administration in an aqueous solution of a parenterally acceptable non-ionic surface active agent. These surface active agents may also be used even where the steroid is sufficiently water soluble as they may reduce the risk of thrombophlebitis.

The non-ionic surface active agents used for the purpose of this invention are generally those of the water-soluble type, conveniently having an HLB value of at least 9, preferably at least about 12, advantageously at least about 13. Preferably the HLB value of the surface active agent is not greater than about 15 although it may, for example, be as high as 18. The surface active agent must naturally be one which is physiologically compatible, i.e. of itself give rise to no physiologically unacceptable side effects in the dosages employed in the intended species to be treated (man or animal). Surface active agents for use in accordance with the invention are for example to be found among the following non-ionic surfactants and classes of surfactants:

Polyoxyethylated derivatives of fatty (C12–C20) glyceride oils, e.g. castor oil, containing from 35 to 45 or even up to 60 oxyethylene groups, per mole of fatty oil. Polyoxyethylene ethers (containing from 10 to 30 oxyethylene groups) of long chain alcohols (containing for example from 12–18 carbon atoms).

Polyoxyethylene-polyoxypropylene ethers containing from 15 to 35 and from 15 to 30 oxyethylene and oxypropylene groups respectively. Polyoxyethylene ethers (containing from 6 to 12 oxyethylene groups) of alkyl phenols the alkyl groups of which preferably contain 6–10 carbon atoms.

Polyoxyethylated (containing from 15 to 30 oxyethylene groups) fatty acid (e.g. C12–18) esters of sugar alcohol anhydrides e.g. sorbitan or mannitan. Long-chain (e.g. C10–16) alkanoyl mono- and di-alkanolamides (the alkanol portions of which for example contain 1–5 carbon atoms) for example lauroyl mono- and di-ethanolamides. Polyethylene glycol esters (containing from 6 to 40 ethylene oxide units) of long chain fatty acids (containing for example 12–18 carbon atoms) e.g. polyethyleneglycol monooleate (containing for example 8 ethylene oxide units).

Examples of non-ionic surface active agents, of the foregoing types, useful in accordance with the invention include:

Cremophor EL, a polyoxyethylated castor oil containing about 40 ethyleneoxide units per triglyceride unit;

Tween 80, polyoxyethylene sorbitan monooleate containing about 20 ethylene oxide units;

Tween 60, polyoxyethylene sorbitan monostearate containing about 20 ethylene oxide units; and Tween 40, polyoxyethylene sorbitan monopalmitate containing about 20 ethylene oxide units.

The expression "solutions" is used herein to denote liquids which have the appearance of true solutions and are thus optically clear and capable of passage, for example, through a micro-porous filter, irrespective of whether such solutions are true solutions in the classical chemical sense and irrespective of whether they are stable or metastable. Thus it may be that the steroid is associated with micelles. The solutions of this invention, irrespective of their precise physical nature, behave as true solutions for the practical purposes of intravenous injection.

The proportion of surface active agent to be used in the compositions of this invention depends upon its nature and upon the concentration of steroid desired in the final composition.

In preferred compositions according to the invention the proportion of surfactant is preferably at least 5% by weight and advantageously above 10% by weight. A very convenient proportion of surfactant has been found to be 20% by weight but 30% and up to 50% may be used. The proportions of surfactant are expressed by weight in relation to the total volume of the composition.

As will be clear, the proportion of steroid which is dissolved in the aqueous solution according to the invention depends upon the nature and amount of surface active agent used. The composition will generally contain at least 1 mg/ml of steroid and solutions can be made containing for example up to 7 mg/ml of steroid or even 10 mg/ml.

In one method of preparing the solutions according to the invention the steroid is first dissolved in the selected surfactant for example, with heating and the resulting solution dissolved in water. Alternatively the steroid may be dissolved in a volatile organic solvent advantageously having a boiling point of less than about 80°C which is miscible with the surface active agent such as a volatile lower aliphatic ketone e.g. acetone or methyl ethyl ketone or a volatile halogenated hydrocarbon e.g. chloroform or methylene chloride. The surface active agent is then added to this solution, the organic solvent removed by evaporation, for example by passing a stream of an inert gas through the solution e.g. nitrogen and the resulting solution of steroid in surfactant is mixed with water.

The solutions may also be prepared by shaking the steroid with an aqueous solution of the surface active agent.

In all cases simple tests enable one to determine the relative proportions of surface active agent required.

The anaesthetic solutions according to the invention are generally administered by intravenous injection although as is known in the anaesthetic art in certain cases, e.g. with young children, intramuscular injection might be preferred.

As is usual in the case of anaesthetics, the quantity of steroid used to induce anaesthesia depends upon the weight of the individual to be anaesthetised. For intravenous administration in the average man a dose of from 0.5 to 30 mg/Kg will in general be found to be satisfactory to induce anaesthesia, the preferred dose being within the range of from 0.7 to 20 mg/Kg. The dose will naturally vary to some extent dependent upon the physical condition of the patient, and the degree and period of anaesthesia required, all as is well known in the art. It is thus possible by adjustment of the dose to achieve durations of anaesthesia varying from about 10 minutes to up to an hour or more. If it is desired to maintain prolonged anaesthesia, repeated doses of the solutions of this invention may be used, such repeated doses being generally either of the same order or lower than the original dose. Alternatively continuous administration may be undertaken at for example a rate of 0.09–1.4 mg/Kg/Min.

Where the anaesthetic solutions are administered intramuscularly, higher doses are generally necessary.

The new compounds according to the invention may be prepared by any convenient method. Thus in general the compounds of the invention may be prepared by a process comprising esterifying a steroid of the 5α-pregnane series having a 3α-OH or protected OH group, a 10-hydrogen atom or a methyl group, an 11-oxo group, a 17α-hydrogen atom, a 20-oxo group, and a 21-hydroxy group or a readily eliminatable 21-substituent, whereby a group -XR is introduced at the 21-position.

We have found, for example, that the compounds may conveniently be prepared from the corresponding 21-chloro, 21-bromo or 21-iodo compounds. We prefer to proceed via the 21-bromo intermediate which may be prepared from 3α-hydroxy-5α-pregnane-11,20-dione. The bromination is effected for example using molecular bromine, in a solvent such as methanol or ethanol advantageously at a temperature of from −10° to +30°C. The reaction is preferably conducted in the presence of a catalyst such as acetyl chloride or hydrogen bromide in acetic acid. The 21halogeno compound may then be converted into the desired 21-acyloxy compound by reaction with a salt of the corresponding carboxylic acid (i.e. a salt furnishing an anion RX-), such as an alkali metal salt (e.g. the potassium salt) or a tertiary amine salt, conveniently an N-methylmorpholine or N-ethylpiperidine salt or a trialkyl-ammonium salt (e.g. the triethylammonium salt). The reaction is preferably carried out in a solvent for example acetone or methanol, advantageously under anhydrous conditions.

Another method comprises acylating the corresponding 21-hydroxy compound having a protected 3α-hydroxy group, to introduce the group -XR at the 21-position and deprotecting the 3α-hydroxy group of the 21-acyloxy compound produced.

The 3α-protected, 21-hydroxy compound may for example be prepared by first protecting the 3α-hydroxy group of the corresponding 3α-hydroxy, 21-unsubstituted compound, and then acylating the 21-position, for example with a lead tetraacylate (e.g. lead tetraacetate) as described in our Belgian Patent No. 752165. Alternatively, the unprotected 3α-hydroxy, 21-unsubstituted compound may first be converted to the 21-acyloxy compound (by the same method) and the 3α-hydroxy group then protected. In either case, the 3α-protected, 21-acyloxy compound may then be hydrolysed to give the 3α-protected, 21-hydroxy compound. It will be appreciated that the 21-acyloxy group introduced by the lead tetraacylate reaction will in general not be of the XR type set out above and will need replacement by the above procedure. Protection of the 3α-hydroxy group may be effected with a protecting substituent which may be removed, for example, under acidic, reductive or other conditions but which is stable for example, under alkaline conditions (i.e. it should be stable under conditions under hydrolyse the 21-acyloxy group), such as a 3α-tetrahydropyranyl or triphenylmethyl substituent or preferably a 3α-nitrate ester. Hydrolysis of the 3α-protected, 21-acyloxy compound to yield the corresponding 21-hydroxy compound is preferably effected under basic conditions, e.g. in the presence of potassium or sodium hydrogen carbonate, conveniently in the presence of a solvent e.g. methanol, ethanol or tetrahydrofuran. The resultant product is reesterified to introduce the -XR group at the 21-position and the 3α-protecting substituent removed.

The esterification is preferably effected using the anhydride or halide e.g. chloride of the desired acid of the formula HXR preferably in the presence of a tertiary amine (e.g. pyridine, collidine, or dimethylaniline) which may also serve as solvent for the reaction.

The protecting group at position 3 may be removed in conventional manner; conditions may be chosen which will not affect the rest of the molecule. Thus for example when the 3α-hydroxy group is protected by the formation of a nitrate ester, the nitrate group may be removed by acid hydrolysis of the compound for example using aqueous mineral acid, or by reduction using, for example, zinc and acetic acid or by catalytic hydrogenation using, for example, palladium on charcoal as catalyst.

Compounds according to the invention wherein R represents an alkyl group substituted by a group of formula -NR¹R² may conveniently be prepared by reacting the corresponding 21-acyloxy compound having a 21-acyloxy group carrying a readily eliminatable substituent, e.g. a halogen atom with an amine of formula HNR¹R², preferably under anhydrous conditions. The 21-acyloxy group can thus be a group R¹X where R¹ is for example, a lower alkyl group (C₁₋₆) carrying a halogen atom, preferably an iodine atom, e.g. an iodoacetoxy group. In general the reaction will be carried out in an organic solvent, for example an etheric solvent e.g. diethyl ether and/or a halogenated hydrocarbon solvent e.g. methylene chloride. The reaction is conveniently effected at about ambient temperature.

The 21-haloacyloxy compounds used in the above reaction, which are themselves compounds in accordance with the invention, may be prepared by known methods, for example by methods analogous to those described above for the preparation of other 21-acyloxy compounds according to the invention. It is generally preferred to use a 21-iodoacyloxy compound in the reaction with the amine of formula HNR¹R² and it has been found convenient, for example, first to prepare the corresponding 21-chloroacyloxy compound and subsequently to convert this compound into the 21-iodoacyloxy compound by known methods, for example by reaction with an iodide preferably an alkali metal iodide such as sodium iodide.

Compounds according to the invention were XR is a lower alkoxycarbonyloxy group may be prepared by reaction of the corresponding 21-hydroxy compound with an alkyl haloformate, preferably in the presence of an acid binding agent (e.g. pyridine).

Compounds according to the invention wherein XR is —OCOSR or —OCONHR are conveniently prepared by first reacting the corresponding 3α-protected, 21-hydroxy compound with a carbonyl halide (preferably phosgene) in the presence of an acid binding agent (e.g. pyridine), and then reacting the product with a thiol (RSH), or an amine (RNH₂). The product may then be deprotected to regenerate the 3α-hydroxy group.

Compounds according to the invention wherein R represents an aralkyl or aryl group substituted by an amino group may be prepared by known methods. We have found it generally convenient to prepare such compounds by the reduction of the corresponding nitro-aralkyl or nitro-aryl compound, for example using catalytically activated hydrogen. The catalyst is preferably a platinum metal catalyst, advantageously a palladium catalyst, e.g. palladium on charcoal. The reduction is generally effected in a solvent, for example a lower alkyl lower acylate, preferably ethyl acetate, a lower alkanol, (e.g. ethanol) or an etheric solvent e.g. tetrahydrofuran.

The nitro compounds required for the above reaction, e.g. the 21-nitrophenacetoxy or 21-nitrobenzoyloxy compounds, may be prepared by known methods, for example by acyloxylation of the corresponding 21-chloro, 21-bromo, 21-iodo or 21-hydroxy compound with a nitrophenylacetic acid, a nitrobenzoic acid or an activated derivative thereof e.g. an acid anhydride or an acid halide thereof.

Other methods for the preparation of the 21-acyloxy compounds may also be used. Thus a 21-acyloxy-5α-pregnane-3,11,20-trione may be stereospecifically reduced, for example, as described by Browne and Kirk (J. Chem. Soc. C, 1969, 1653) using chloroiridic acid or by an enzymatic method such as reduction with brewers yeast (Saccharomyces cerevisiae). This latter method may be convenient, for example, for the preparation of 21-substituted-alkanoyloxy compounds such as 21-substituted-acetoxy compounds.

The iridium reduction is preferably carried out by first preparing an iridium catalyst reduction system from an iridium salt or acid (e.g. chloroiridic acid), an ester of phosphorous acid (e.g. trimethyl phosphite), water, and an organic reaction medium (e.g. an alcohol such as isopropanol). This reduction system is then preferably neutralised with an organic base (e.g. triethylamine), and reacted with the steroid.

If the desired end compound contains a free NH₂ group this may be protected during manufacture e.g. by a benzyloxycarbonyl group and the protecting group subsequently removed e.g. by catalytic hydrogenolysis.

For example, a benzyloxycarbonylamino acid as its salt may be reacted with a corresponding 21-hydroxy or 21-halo (preferably iodo) compound in the usual way to acylate the 21-position and the ester produced may then be reacted with a corresponding 21-hydroxy or 21-halo (preferably iodo) compound in the usual way to acylate the 21-position and the ester produced may then be reduced (e.g. in the presence of palladium charcoal catalyst) to remove the benzyloxycarbonyl group.

Substitution in the steroid molecule can be carried out in conventional manner, either prior to or after formation of the acyloxy group at position 21. Substitution at the 2β-position can be effected for example by way of the corresponding 2α,3α-epoxy compound. The epoxy compound itself may be prepared by first dehydrating a 3α-hydroxy compound to give the corresponding $\Delta^2$ compound (e.g. by first tosylating the hydroxy group and then removing the elements of p-toluene sulphonic acid from the product), and then treating the $\Delta^2$ compound with a peracid to form the 2α,3α epoxide ring. A 2β-subtituent, Z, may then be introduced and the 3α-hydroxy group regenerated by reacting the 2α,3α-epoxy compound with a compound of the formula ZH or a compound furnishing an anion $Z^-$ and a cation, followed, where a metal derivative of the 3α-hydroxy group is first formed, by treatment with a source of protons.

The 3α-hydroxy-21-chloro- and 21-iodo- 5α-pregnane-11,20-diones referred to above as intermediates in the preparation of the compounds of the invention are themselves new compounds and constitute a further aspect of the invention. These compounds possess anaesthetic properties similar to the other 21-subtituted compounds of the invention, and they may be similarly used and formulated.

The 21-iodo compounds can be prepared from the corresponding 21-bromo compounds by reaction with an alkali metal iodide, e.g. sodium iodide, preferably in a ketone solvent e.g. acetone. Alternatively, a 21-iodo compound can be prepared by reaction of a corresponding 21-hydroxy compound with an alkali metal iodide. The 21-chloro compounds can be obtained by reaction of the corresponding 21-iodo compounds with an alkali metal chloride, e.g. lithium chloride, preferably in a ketone solvent and as acetone. Alternatively, a 21-chloro compound can be prepared for a corresponding 21-hydroxy compound by first forming a 21-mesyloxy derivative, followed by reaction with chloride ions to replace the mesyloxy group by chloride. This reaction sequence can be effected by reacting the 21-hydroxy compound with methanesulphonyl chloride.

For the better understanding of the invention the following Examples are given by way of illustration only. All temperatures are given in degrees Celsius. The term petrol refers to petroleum ether (b.p. 60°–80°).

Optical rotations were determined in chloroform solution at approximately 1% w/v concentration unless stated otherwise. Preparative thin layer chromatography ("preparative t.l.c.") was carried out on silica gel.

EXAMPLE 1

3α-Hydroxy-21-p-nitrophenylacetoxy-5α-pregnane-11,20-dione

3α-Hydroxy-5α-pregnane-11,20-dione (2g) in methanol (14 ml.) at 30° was stirred with acetyl chloride (3 drops). After 2 minutes bromine (0.38 ml.) in methanol (9 ml.) was added dropwise. The addition of bromine took 25 minutes. The solution was poured into stirred water (300 ml.) and the product was collected, washed and dried at the pump to give crude 21-bromo-3α-hydroxy-5α-pregnane-11,20-dione (2.7 g.). This material and p-nitrophenylacetic acid (27.2 g.) were refluxed with dry acetone (100 ml.) containing dry triethylamine (13.8 ml.). After 4 hours the solution was poured into chloroform (500 ml.), washed with saturated sodium bicarbonate (2 × 200 ml.) and with water (3 × 200 ml.), dried over magnesium sulphate and evaporated to a brown oil. This was triturated with light petroleum (bp. 40°–60°) and the residue was purified by preparative t.l.c. to give title compound as a white froth (1.33 g.) which crystallised from chloroform/ether as a white solid (1.12 g.); m.p. 166°–190° (dec.); $[\alpha]_D + 48°$;

EXAMPLE 2

21-p-Aminophenylacetoxy-3α-hydroxy-5α-pregnane-11,20-dione

3α-Hydroxy-21-p-nitrophenylacetoxy-5α-pregnane-11,20-dione (512 mg.) and 5% palladium on charcoal (200 mg.) in ethyl acetate (25 ml.) were stirred with hydrogen at room temperature and pressure. When 70 ml. of hydrogen had been absorbed the catalyst was removed, washed with ethyl acetate and the combined filtrates were evaporated to a froth. Purification by preparative t.l.c. gave title compound (325 mg.) as a froth; $[\alpha]_D + 76°$.

EXAMPLE 3

3α,21-Dihydroxy-5α-pregnane-11,20-dione,21-nicotinate

A solution of 21-bromo-3α-hydroxy-5α-pregnane-11,20-dione (1. g.) in acetone (25 ml.) was refluxed with nicotinic acid (7.8 g.) and triethylamine (5.4 ml.) for one hour. The mixture was evaporated to a residue which was dissolved in ether and ethyl acetate. The solution was washed with water, 1% aqueous sodium bicarbonate solution and again with water, dried (Na₂SO₄) and evaporated to a foam (860 mg.). Purification by preparative t.l.c. followed by crystallisation from chloroform and benzene gave title compound, (416 mg.) as off white plates; m.p. 208°–211° (dec); $[\alpha]_D + 110.5°$

EXAMPLE 4

21-chloroacetoxy-3α-hydroxy-5α-pregnane-11,20-dione a. Fuming nitric acid (20 ml.) was added slowly with stirring to acetic anhydride (45 ml.) at −5°. A solution of 21-acetoxy-3α-hydroxy-5α-pregnane-11,20-dione (10 g.) in chloroform (40 ml.) was added and the mixture stirred at −5°. After 1 hour the mixture was neutralised to pH4 with 2N sodium hydroxide solution and then extracted with chloroform. The organic layer was washed with water, dried (Na₂SO₄) and evaporated to give 21-acetoxy-3α-nitro-oxy-5α-pregnane-11,20-dione as a residue.

b. A solution of this residue in methanol (600 ml.) and tetrahydrofuran (400 ml.) was refluxed with 10% aqueous potassium bicarbonate solution (56 ml.) under nitrogen for 30 minutes. The mixture was neutralised with glacial acetic acid and evaporated. A solution of the residue in chloroform was washed with water, dried (Na₂SO₄) and evaporated to give 21-hydroxy-3α-nitro-oxy-5α-pregnane 11,20-dione as a residue.

c. A solution of 21-hydroxy-3α-nitro-oxy-5α-pregnane-11,20-dione (500 mg.) in dry tetrahydrofuran (10 ml.) at 0° was treated with a solution of chloroacetic anhydride (1 g.) in dry pyridine (0.5 ml.) at 0°. The mixture was allowed to warm to room temperature. After 10 minutes the solution was diluted with ether, washed with dilute hydrochloric acid, saturated sodium bicarbonate solution, and with water, dried ($Na_2SO_4$) and evaporated. Crystallisation from chloroform and ether gave 21-chloroacetoxy-3α-nitro-oxy-5α-pregnane-11,20-dione (446 mg.) as pale yellow rods; m.p. 137°–138°; $[α]_D + 90°$.

d. 21-Chloroacetoxy-3α-hydroxy-5α-pregnane-11,20-dione

A solution of 21-chloroacetoxy-3α-nitro-oxy-5α-pregnane-11,20-dione (300 mg.) in glacial acetic acid (10 ml.) was stirred with zinc powder (1 g.) for 1 hour at 20°. The mixture was filtered. The zinc was washed with chloroform and the combined filtrates washed with water, saturated sodium bicarbonate solution and water, dried ($Na_2SO_4$) and evaporated. Crystallisation from acetone and ether gave title compound (142 mg.) as colourless needles; m.p. 144°–147°; $[α]_D + 110°$.

EXAMPLE 5

3α-hydroxy-21-iodoacetoxy-5α-pregnane-11,20-dione

21-Chloroacetoxy-3α-hydroxy-5α-pregnane-11,20-dione, [prepared from 21-acetoxy-3α-hydroxy-5α-pregnane-11,20-dione (10g) essentially as described in Example 4 but without crystallisation of the various intermediates], in acetone (500 ml.) was refluxed with sodium iodide (10 g.) for one hour. The mixture was evaporated to small volume, diluted with ether, washed with water, dried ($Na_2SO_4$) and evaporated to a foam (11.63 g.). A small portion (500 mg.) was subjected to preparative t.l.c. to give title compound (425 mg.) as a foam; $[α]_D + 68°$;

EXAMPLE 6

3α-Hydroxy-21-N,N-dimethylaminoacetoxy-5α-pregnane-11,20-dione

A solution of 21-iodoacetoxy-3α-hydroxy-5α-pregnane-11,20-dione (700 mg.) in dry ether (20 ml.) and dry methylene chloride (10 ml.) was treated with dimethylamine (2.5 ml.) at room temperature. After 15 minutes the mixture was diluted with ether, washed with water, dried ($Na_2SO_4$) and evaporated to a foam. Purification by preparative t.l.c. followed by crystallisation from ethyl acetate and petrol gave title compound (85 mg.); m.p. 147°–149°; $[α]_D + 92°$.

EXAMPLE 7

3α-Hydroxy-21-morpholinoacetoxy-5α-pregnane-11,20-dione

A solution of 21-iodoacetoxy-3α-hydroxy-5α-pregnane-11,20-dione (750 mg.) in dry ether (20 ml.) and dry methylene chloride (20 ml.) was treated with morpholine (1 ml.) at room temperature. After 10 minutes the mixture was diluted with chloroform, washed with water, dried ($Na_2SO_4$) and evaporated to a foam. Purification by preparative t.l.c. followed by crystallisation from ethyl acetate and petrol gave title compound (343 mg.) as colourless plates; m.p. 131°–133°; $[α]_D + 87.5°$.

EXAMPLE 8

3α-Hydroxy-21-[N-methyl-piperazinoacetoxy]-5α-pregnane-11,20-dione

A solution of 21-iodoacetoxy-3α-hydroxy-5α-pregnane-11,20-dione (180 mg.) in dry ether (20 ml.) and dry methylene chloride (5 ml.) was treated with N-methylpiperazine (0.5 ml.). After 18 hours the mixture was diluted with ether, washed with water, dried ($Na_2SO_4$) and evaporated. Purification by preparative t.l.c. followed by crystallisation from ethyl acetate and petrol gave title compound (80 mg.); m.p. 158°–163°; $[α]_D + 83°$;

EXAMPLE 9 a. 21-Ethoxycarbonyloxy-3α-nitro-oxy-5α-pregnane-11,20-dione

A solution of 21-hydroxy-3α-nitro-oxy-5α-pregnane-11,20-dione; [500 mg.] in dry methylene chloride (10 ml.) and dry pyridine (1 ml.) was treated with ethyl chloroformate (0.11 ml.) at 0°. After 25 minutes the mixture was diluted with chloroform, washed with water, dried ($Na_2SO_4$) and evaporated to a foam. Crystallisation from chloroform and ether gave title compound (487 mg.) as colourless needles; m.p. 159°–161°; $[α]_D + 94°$.

b. 21-Ethoxycarbonyloxy-3α-hydroxy-5α-pregnane-11,20-dione

A solution of 21-ethoxycarbonyloxy-3α-nitro-oxy-5α-pregnane-11,20-dione (350 mg.) in glacial acetic acid (12 ml.) was stirred with zinc powder (1.2 g.) at 19° for 1¼ hours. The mixture was filtered and the zinc washed with chloroform. The combined filtrates were washed with water, dried ($Na_2SO_4$) and evaporated to a foam. Crystallisation from acetone and ether gave title compound (227 mg.) as colourless rods; m.p. 176°–179°; $[α]_D + 98°$.

EXAMPLE 10 a. 3α-Hydroxy-21-iodo-5α-pregnane-11,20-dione

A solution of 21-bromo-3α-hydroxy-5α-pregnane-11,20-dione (0.4 g;) in acetone (4 ml) was treated with sodium iodide (0.4 g). The resulting mixture was refluxed for 30 min., cooled and partitioned between water and ether. The organic layer was washed with water, dried ($Na_2SO_4$) and evaporated. The residue (387 mg) was recrystallised from acetone/petroleum ether to afford title compound (0.2 g,) as white needles, m.p. 127°; $[α]_D + 102°$.

b. 21-Chloro-3α-hydroxy-5α-pregnane-11,20-dione

A solution of the above 21-iodide (0.4 g,) in acetone (16 ml) was treated with anhydrous lithium chloride (0.5 g). The mixture was then refluxed for 1 hr., cooled and partitioned between water and ether. The organic layer was washed with water, dried ($Na_2SO_4$) and evaporated. Recrystallisation of the residue from acetone/petroleum ether gave title compound (170 mg,) as white prisms, m.p. 141°; $[α]_D + 104°$ (c 1.7)

c. 21-Benzyloxycarbonylaminoacetoxy-3α-hydroxy-5α-pregnane-11,20-dione

A solution of the above 21-iodide (300 mg.) and N-benzyloxycarbonylglycine (336 mg.) and triethylamine (0.18 ml.) in acetone (13 ml.) was heated under reflux for 1 hour when t.l.c. (chloroform-acetone 4:1) showed complete consumption of the iodide. Acetone was removed in vacuo at 30° and the residue was partitioned between ethyl acetate and water. The ethyl acetate was washed with water, sodium bicarbonate solution and water, dried and concentrated to give the ester as a froth (0.373 g.) $[α]_D + 71°$ (c 0.9).

c. 21-Aminoacetoxy-3α-hydroxy-5α-pregnane-11,20-dione hydrochloride

A solution of the above ester (327 mg.) in dioxane (10 ml.) and 0.1N-hydrochloric acid (6.1 ml.) was stirred with 5% palladised charcoal (0.15 g.) under an atmosphere of hydrogen for 2 hours. The solution was filtered through Kieselguhr and the filtrate was lyophilised. Water was added to the puffy residue (250 mg.) and the cloudy solution was filtered through Kieselguhr and lyophilised to give the glycinate hydrochloride as a pale yellow amorphous solid (224 mg.) $\tau$ (D$_2$O, 100 MHz) 5.07 (2-proton S; C-21 H$_2$), 5.95 (2 proton S; COCH$_2$N$^+$H$_3$) 6.03 (1 proton narrow multiplet; C-3 H), 9.04 (3 proton S; C-19 H$_3$) and 9.44 (3 proton S; C-18 H$_3$), $\nu_{max.}$ (Nujol) 3360 (OH + H$_2$O), 1755 + 1218 (ester) and 1700 cm.$^{-1}$ (ketone). Electrophoresis at pH 1.9 showed one cationic component revealed with potassium iodoplatinate reagent.

EXAMPLE 11

21-Diethylaminoacetoxy-3α-hydroxy-5α-pregnane-11,20-dione

A solution of 3α-hydroxy-21-iodoacetoxy-5α-pregnane-11,20-dione [870 mg.] in dry methylene chloride (20 ml.) was treated with diethylamine (1 ml.) at room temperature. After 20 minutes the mixture was diluted with chloroform, washed with water, dried (Na$_2$SO$_4$) and evaporated to a foam (800 mg.) Purification by preparative t.l.c. followed by crystallisation from ethyl acetate and petroleum ether (b.p. 60°–80°) gave title compound, (313 mg.) as off-white needles; m.p. 129°–134°; [α]$_D$ + 86°.

EXAMPLE 12

21-Diethylaminoacetoxy-3α-hydroxy-2β-methoxy-5α-pregnane-11,20-dione

Fuming nitric acid (13.0 ml.) was added cautiously to acetic anhydride (52 ml.) at below –5° and a solution of 21-bromo-3α-hydroxy-2β-methoxy-5α-pregnane-11,20-dione (5.5 g.) in chloroform (52 ml.) was added slowly. The reaction mixture was stirred at below –5° for 1 hr., pipetted into cool 2N sodium hydroxide (260 ml.) and extracted with chloroform, washed with saturated sodium bicarbonate and water, dried (Na$_2$SO$_4$) and evaporated. The residue was treated with benzene and the solvent removed in vacuo to give crude 21-bromo-2β-methoxy-3α-nitro-oxy-5α-pregnane-11,20-dione (6.1 g.).

The bromo-compound (6.1 g.) was refluxed with dry potassium acetate (9.4 g.) in dry acetone (120 ml.) with stirring. After 3.5 hr. the solution was poured into chloroform, washed with water, dried (Na$_2$SO$_4$) and evaporated to yield crude crystalline 21-acetoxy-2β-methoxy-3α-nitro-oxy-5α-pregnane-11,20-dione. The total product in methanol (250 ml.) was hydrolysed, under nitrogen with stirring, with 10% potassium bicarbonate (12 ml.). After 30 min., and after 60 min. methanol (60 ml.) and 10% potassium bicarbonate (6 ml.) were added. After 2.5 hr. the solution was adjusted to pH 5 with glacial acetic acid, concentrated, and poured into water with stirring. The crude 21-hydroxy-2β-methoxy-3α-nitro-oxy-5α-pregnane-11,20-dione (5.3 g.) was collected by filtration after 1 hr. and dried in vacuo. It was dissolved in dry tetrahydrofuran (112 ml.) and a solution of chloroacetic anhydride (11.0 g.) in dry tetrahydrofuran (17 ml.) and pyridine (6 ml.) was added at 0°. The mixture was allowed to warm to room temperature and after 15 min. the solution was diluted with ether, washed with 2N hydrochloric acid, saturated sodium bicarbonate and water, dried (Na$_2$SO$_4$), and evaporated to give crystalline 21-chloroacetoxy-2β-methoxy-3α-nitro-oxy-5α-pregnane-11,20-dione (5.4 g.), This, in glacial acetic acid (180 ml.), was stirred with zinc powder (18 g.) for 1 hr. The excess of zinc was removed by filtration and washed with chloroform. The chloroform solution was washed with water, saturated sodium bicarbonate and water, dried (Na$_2$SO$_4$), and evaporated. The product was purified by preparative t.l.c. using chloroform as solvent, to give 21-chloroacetoxy-3α-hydroxy-2β-methoxy-5α-pregnane-11,20-dione (1.6 g.)

The 21-chloroacetate (1.0 g.) in acetone (50 ml.) was refluxed with sodium iodide (1.0 g.) for 1 hr. The reaction mixture was concentrated, diluted with ether, washed with water, dried (Na$_2$SO$_4$) and evaporated to give 3α-hydroxy-21-iodoacetoxy-2β-methoxy-5α-pregnane-11,20-dione (1.1 g.). This was dissolved in dry methylene chloride (350 ml.) and stirred under dry nitrogen with diethylamine (1.5 ml.) at room temperature for 1 hr. The reaction mixture was then washed with water, dried (Na$_2$SO$_4$), and evaporated to a foam. This was purified by preparative t.l.c. in equal parts of ethyl acetate and acetone to give title compound (0.3 g.) as a foam, [α]$_D$ + 96° (c 0.97).

EXAMPLE 13

21-Diethylaminoacetoxy-3α-hydroxy-5α-pregnane-11,20-dione citrate

A solution of 21-diethylaminoacetoxy-3α-hydroxy-5α-pregnane-11,20-dione (46.16 mg.) in absolute ethanol (0.5 ml.) was treated with 0.1M aqueous citric acid (1 ml.). The ethanol was removed by evaporation and the resulting solution freeze-dried. Water (2.5 ml.) was added and the slightly cloudy solution obtained left to stand at room temperature for several hours. The solution was filtered and the filtrate was diluted with water to give the title compound as a 10 mg./ml. aqueous solution with respect to steroid free base. The pH of the solution was 3.51.

EXAMPLE 14

3α-Hydroxy-21-dimethylaminoacetoxy-5α-pregnane-11,20-dione citrate.

This was prepared as described in the preceding example but starting with 3α-hydroxy-21-dimethylaminoacetoxy-5α-pregnane-11,20-dione (43.36 mg.) to give the title compound as aqueous solution, pH 3.50, containing 10 mg./ml. with respect to steroid free base.

The aqueous solutions of the citrates described in Examples 13 and 14 may be used directly as anaesthetics Further Examples of pharmaceutical formulations of the compounds of the invention are given in Examples 15 and 16 below.

EXAMPLE 15

0.03 g of 21-ethoxycarbonyloxy-3α-hydroxy-5α-pregnane-11,20-dione were dissolved in 2 mls of acetone. The resulting solution was added to 2 g of Cremophor EL at 20°C., and stirred until homogeneous. The acetone was removed by a vigorous stream of nitrogen. The solution was diluted with sterile distilled water containing 0.05 g of sodium chloride to give a final volume of 10 mls.

EXAMPLE 16

0.03 g of 21-p-aminophenyl acetoxy-3α-hydroxy-5α-pregnane-11,20-dione were dissolved in 2 mls of acetone. The resulting solution was added to 2 g of Cremophor EL at 20°C., and stirred until homogeneous. The acetone was removed by a vigorous stream of nitrogen. The solution was diluted with sterile distilled water containing 0.05 g of sodium chloride to give a final volume of 10 mls.

PREPARATIONS 1. 3α-Hydroxy-2β-methoxy-5α-pregnane-11,20-dione

2α,3α-Epoxy-5α-pregnane-11,20-dione (200 mg) was dissolved in dry methanol (20 ml), and concentrated sulphuric acid (0.1 ml.) was added. The solution was stirred at room temperature for 20 minutes, and then poured into water (125 ml.) to give a white crystalline precipitate which was filtered off and dried in vacuo over phosphorus pentoxide to give title compound (175 mg.), m.p. 163°–164°, [α]$_D$ + 109°.

2. 21-Bromo-3α-hydroxy-2β-methoxy-5α-pregnane-11,20-dione

A solution of 3α-hydroxy-2β-methoxy-5α-pregnane-11,20-dione (2 g.) in methanol (15 ml.) was treated with hydrobromic acid in glacial acetic acid (3 drops). The mixture was stirred at room temperature and bromine (530 mg.) in methanol (1.45 ml.) was added dropwise over a period of 30 minutes. The mixture was stirred for a further 30 minutes and poured into water, stirred, filtered, washed with water and dried. Purification by preparative t.l.c. followed by crystallisation from ethyl acetate and petrol gave title compound (250 mg.) as colourless plates; m.p. 185°–188°; [α]$_D$ + 104°.

We claim:

1. A steroid of the 5α-pregnane series possessing a 3α-hydroxy group, a 10-hydrogen or methyl group, and 11-oxo group, a 17α-hydrogen atom, a 20-oxo group and a group of the formula -XR at the 21-position, wherein X represents a group of the formula —OCO— or —OCOO— and R represents:

a. an alkyl group of 1–5 carbon atoms or a benzyl group, each of said alkyl or benzyl groups being substituted by a group of the formula -NR$^1$R$^2$ wherein R$^1$ and R$^2$ are the same or different and each represents a hydrogen atom or an alkyl group having 1–4 carbon atoms or wherein R$^1$ and R$^2$ together with the nitrogen atom represent a piperazino or morpholino group or such a group substituted by at least one alkyl group containing 1–6 carbon atoms; or a pyridyl group;
   b. a nitrobenzyl group when X is —OCO—; or
   c. a lower alkyl group containing 1–5 carbon atoms when X is —OCOO—.

2. A steroid as claimed in claim 1 wherein XR is an —OCOR group.

3. The steroid of claim 1 which possesses at the 2β-position a lower alkoxy group.

4. A steroid as claimed in claim 1 wherein the group -NR'R$^2$ is an unsubstituted amino group or a dimethylamino, a diethylamino, or a morpholino group.

5. A steroid as claimed in claim 1 in the form of the salt of the steroid with a physiologically compatible acid.

6. 21-Diethylaminoacetoxy-3α-hydroxy-2β-methoxy-5α-pregnane-11,20-dione.

7. 21-Aminoacetoxy-3α-hydroxy-5α-pregnane-11,20-dione hydrochloride.

8. 21-Diethylaminoacetoxy-3α-hydroxy-5α-pregnane-11,20-dione.

9. 21-Dimethylaminoacetoxy-3α-hydroxy-5α-pregnane-11,20-dione.

10. 21-Aminophenylacetoxy-3α-hydroxy-5α-pregnane-11,20-dione.

11. 21-Ethoxycarbonyloxy-3α-hydroxy-5α-pregnane-11,20-dione.

12. A steroid of the formula:

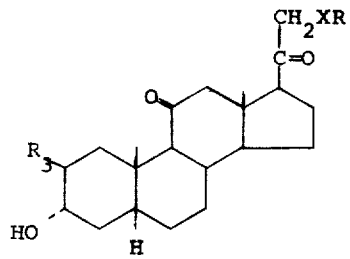

or a pharmaceutically acceptable acid-addition salt thereof, wherein R$_3$ is selected from the group consisting of hydrogen and lower alkoxy; X is selected from the group consisting of —OCO— and —OCOO— and R represents:

a. an alkyl group containing 1–5 carbon atoms or a benzyl group, each of said alkyl or benzyl groups being substituted by a group of the formula -NR$^1$R$^2$ wherein R$^1$ and R$^2$ are the same or different and each represents a hydrogen atom or an alkyl group having 1–4 carbon atoms or wherein R$^1$ and R$^2$ together with the nitrogen atom represents a piperazino or morpholino group or such a group substituted by at least one alkyl group containing 1–6 carbon atoms; or a pyridyl group;
   b. a nitrobenzyl group when X is —OCO— or
   c. a lower alkyl group containing 1–5 carbon atoms when X is —OCOO—.

* * * * *